United States Patent
Yu et al.

(10) Patent No.: US 11,071,614 B2
(45) Date of Patent: *Jul. 27, 2021

(54) MEASURING APPARATUS FOR MEASURING OCCLUSAL DISTANCE AND/OR SPACE OF MISSING TOOTH

(71) Applicant: Sichuan University, Sichuan (CN)

(72) Inventors: Haiyang Yu, Sichuan (CN); Zhaozhao Chen, Sichuan (CN); Xi Chen, Sichuan (CN)

(73) Assignee: SICHUAN UNIVERSITY, Chengdu (CN)

( * ) Notice: Subject to any disclaimer, the term of this patent is extended or adjusted under 35 U.S.C. 154(b) by 291 days.

This patent is subject to a terminal disclaimer.

(21) Appl. No.: 16/327,963

(22) PCT Filed: Mar. 27, 2018

(86) PCT No.: PCT/CN2018/080645
§ 371 (c)(1),
(2) Date: Feb. 25, 2019

(87) PCT Pub. No.: WO2019/085382
PCT Pub. Date: May 9, 2019

(65) Prior Publication Data
US 2021/0038356 A1 Feb. 11, 2021

(30) Foreign Application Priority Data
Nov. 2, 2017 (CN) .......................... 201721444668.0

(51) Int. Cl.
*A61C 19/05* (2006.01)
*G01B 5/02* (2006.01)
*A61C 8/00* (2006.01)

(52) U.S. Cl.
CPC ................ *A61C 19/05* (2013.01); *G01B 5/02* (2013.01); *A61C 8/0089* (2013.01)

(58) Field of Classification Search
CPC ....... A61C 8/0089; A61C 8/009; A61C 19/04; A61C 19/05; A61C 19/052; G01B 5/02;
(Continued)

(56) References Cited

U.S. PATENT DOCUMENTS 1,526,619 A * 2/1925 Williams ............... A61C 19/00
33/513
1,639,626 A * 8/1927 Badger .................. A61C 11/00
433/57

(Continued)

FOREIGN PATENT DOCUMENTS

| CH | 254831 | * | 5/1948 |
| CN | 203693813 | | 7/2014 |

(Continued)

OTHER PUBLICATIONS

International search report dated Jul. 31, 2018 from corresponding application No. PCT/CN2018/080645.

*Primary Examiner* — Jacqueline T Johanas
*Assistant Examiner* — Sharon E Kennedy
(74) *Attorney, Agent, or Firm* — Hauptman Ham, LLP (57) ABSTRACT

A measuring apparatus for measuring an occlusal distance and/or a space of a missing tooth comprises a connecting rod and a measuring head disposed at an upper end of the connecting rod, the measuring head comprises a first measuring ruler and a second measuring ruler perpendicular to the first measuring ruler, a lower end of the second measuring ruler and one end of the first measuring ruler are connected to the connecting rod. The occlusal distance checking can be performed simply and directly by using the first measuring ruler to directly compare whether it can pass through the occlusion gap in the region to be repaired, the gap of the single missing tooth analysis is performed easily and directly by using the second measuring ruler to directly (Continued)

compare whether it can pass the gap in the measuring region to be repaired.

19 Claims, 3 Drawing Sheets

(58) Field of Classification Search
CPC .. G01B 5/14; G01B 5/16; G01B 5/166; B43L 13/147; B43L 13/149; B43L 13/145; B43L 7/027; B43L 7/033
USPC ........ 433/68, 72, 75; 33/474, 476, 479, 480, 33/481; D10/64
See application file for complete search history.

(56) References Cited

U.S. PATENT DOCUMENTS

| | | | | | |
|---|---|---|---|---|---|
| 1,800,714 | A | * | 4/1931 | Clapp | A61C 19/04 33/1 R |
| 1,860,174 | A | * | 5/1932 | Cronk | G01B 3/00 33/563 |
| 1,944,601 | A | * | 1/1934 | Gulick | A61C 19/04 33/513 |
| 3,131,475 | A | * | 5/1964 | Craigo | A61C 11/00 433/71 |
| 4,449,929 | A | * | 5/1984 | Reese | A61C 19/04 433/56 |
| 5,836,767 | A | * | 11/1998 | Aspel | A61C 7/04 433/141 |
| 6,467,179 | B1 | * | 10/2002 | Wolf | B43L 7/027 33/465 |
| 7,059,852 | B2 | | 6/2006 | Chu | |
| D596,054 | S | * | 7/2009 | Nieto | A61C 19/05 D10/64 |
| 7,632,238 | B1 | * | 12/2009 | Scarberry | A61B 5/1072 600/590 |
| 8,123,521 | B1 | * | 2/2012 | Kopp | A61C 9/0006 433/68 |
| D658,520 | S | * | 5/2012 | Abdullah | D10/64 |
| 8,347,517 | B2 | * | 1/2013 | Polei | A61C 19/04 33/514 |
| D739,529 | S | * | 9/2015 | Tajima | D24/140 |
| 2003/0044751 | A1 | * | 3/2003 | Deslauriers | A61C 19/04 433/72 |
| 2015/0191039 | A1 | * | 7/2015 | Johnson | B43L 13/028 33/427 |
| 2020/0093582 | A1 | * | 3/2020 | Wagner | A61B 3/111 |
| 2021/0030520 | A1 | * | 2/2021 | Yu | A61C 19/05 |

FOREIGN PATENT DOCUMENTS

| | | |
|---|---|---|
| CN | 107647929 | 2/2018 |
| DE | 739851 | * 10/1943 |
| JP | 2012254232 | * 12/2012 |
| WO | WO-2020192025 A1 | * 10/2020 |

* cited by examiner

MEASURING APPARATUS FOR MEASURING OCCLUSAL DISTANCE AND/OR SPACE OF MISSING TOOTH

RELATED APPLICATIONS

The present application is a National Phase of International Application Number PCT/CN2018/080645, filed Mar. 27, 2018. and claims the priority of China Application No. 201721444668.0, filed Nov. 2, 2017.

FIELD OF THE INVENTION

The present invention relates to the field of measuring technique for dental implant restoration, and more particularly to a measuring apparatus for measuring an occlusal distance and/or a space of a missing tooth.

BACKGROUND OF THE INVENTION

Dental implants are favored by patients with missing teeth due to features such as not damaging natural teeth, high comfort and good aesthetic effect, and is one of important means to restore missing teeth at present. The oral implantology technology has been developed for more than 40 years. In the continuous development, based on accumulated cases and experimental researches, clinicians and scholars have gradually explored more scientific and reasonable treatment schemes and techniques, causing the postoperative success rate of dental implant to improve gradually. Currently, the most commonly used dental implant consists of two parts, including an implant in the jawbone and an upper prosthesis in the mouth. Meanwhile, the concept of the dental implant restoration has also changed from a "surgery-oriented" stage to a "restoration-oriented" stage. However, while dental implants are widely used in clinical treatment, relevant complications also continue to emerge. Research shows that causes of dental implant complications comprise poor three-dimensional position of implants, insufficient thickness of soft tissues around implants, and poor design of prostheses. Reasons for the above factors are mostly related to the lack of preoperative spatial analysis. Therefore, in order to reduce the occurrence of adverse events such as dental implant complications and better realize the restoration-oriented dental implantation, preoperative analysis of intraoral space and model space is extremely essential.

At present, most clinicians adopt the model analysis and visual method for intraoral analysis, intraoral analysis highly dependent on the clinician's experience, prone to errors due to the effect of factors such as the inspection angle and sight line, and ignoring the examination of the mouth opening degree of patients (vertical distance between the upper and lower edges of central incisor at the maximum mouth opening) and occlusal distance (vertical distance between the upper surface of the implant and the jaw teeth when the upper and lower dentitions are in the widest contact), thereby resulting in problems such as difficulties in later restoration. Model analysis firstly prepares a denture model by making a female die of denture and pouring gypsum into the female die, and then measures the region to be repaired of the model. Since the region to be repaired of the denture model is in an irregular shape, the operation difficulty of measuring with a ruler is large, the operation process is complicated, and the measurement accuracy is poor, which is often necessary to rely on experience to perform secondary treatment on the data after the measurement.

To sum up, current intraoral and model analysis of space relies on clinical experience, and lacks of accurate and efficient measuring means as well as clear measuring methods and standards.

SUMMARY OF THE INVENTION

The present invention aims to provide a measuring apparatus for measuring an occlusal distance and/or a space of a missing tooth. The measuring apparatus has simple structure, is easy to use and provides accurate data in measuring, and is able to measure the occlusal distance and the gap of the missing tooth precisely and quickly, solving the problem that current intraoral and model analysis of space relies on clinical experience and lacks of accurate and efficient measuring means.

The present invention is realized by the following technical scheme:

A measuring apparatus for measuring an occlusal distance and/or a space of a missing tooth comprises a connecting rod and a measuring head, wherein the measuring head is disposed at an upper end of the connecting rod, the measuring head comprises a first measuring ruler and a second measuring ruler, a lower end of the second measuring ruler is connected to the upper end of the connecting rod, the first measuring ruler and the second measuring ruler are perpendicular to each other, and one end of the first measuring ruler is connected to a side of the connecting rod.

Further, the second measuring ruler comprises a first measuring part, a second measuring part and a third measuring part which are sequentially connected from bottom to top, wherein the first measuring part, the second measuring part and the third measuring part are rectangular plates and widths thereof are sequentially reduced, and a lower end of the first measuring part is connected to the upper end of the connecting rod. The first measuring part, the second measuring part and the third measuring part have preferably the same height in the vertical direction, and their widths are preset according to the width of the permanent lower anterior teeth and the accessional teeth. The inclined direction of the second measuring ruler is in line with the direction of the upper end of the connecting rod. The second measuring ruler can be used to measure the gap of the single missing tooth. When in measuring, the distance between the most salient points on the adjacent surfaces near the gap of two adjacent teeth in the region to be repaired is comparatively measured by using the second measuring ruler, judging whether the implant restoration can be conducted and selecting an appropriate implant by comparatively measuring the measuring part able to pass the gap of the single missing tooth, allowing analyzing the gap of the single missing tooth easily and directly, and eliminating the errors caused by visual inspection.

Further, the first measuring ruler comprises a sixth measuring part, a fourth measuring part and a fifth measuring part connected sequentially, wherein the fifth measuring part is disposed away from the connecting rod, and an end of the sixth measuring part away from the fourth measuring part is connected to a side of the upper end of the connecting rod.

Preferably, both the fifth measuring part and the fourth measuring part are rectangular plates, and a width of the fifth measuring part is less than a width of the fourth measuring part. The first measuring ruler in this scheme can be used to check the occlusal distance, and the dimensions of the fifth measuring part, the fourth measuring part and the sixth measuring part are preset according to the requirements of the intermaxillary distance. When measuring, the patient is requested to occlude to maintain the widest and closest contact between the upper and lower teeth, the operator holds the second measuring assembly to conduct comparative measurement. If the fourth measuring part can pass the occlusion gap, the intermaxillary distance is demonstrated to be large enough, thus the upper prosthesis could be fixed by binders or screws. If the fourth measuring part cannot pass and the fifth measuring part can pass, the intermaxillary distance is demonstrated to be medium, screw retention is preferred. If the fifth measuring part cannot pass, the intermaxillary distance and the restoration space are demonstrated to be too small to accommodate the abutment and the prosthesis, which is not suitable for the implant restoration. Occlusal distance checking can be performed simply and directly by using the first measuring ruler in this scheme to directly compare whether the first measuring ruler can pass through the occlusion gap in the region to be repaired, effectively solving the problem that the upper restoration cannot be completed due to insufficient occlusal distance, and providing accurate and reliable basis for selecting the retention method of the abutment (screw retention or binder retention).

As another further improvement of the present invention, the connecting rod comprises an upper connecting rod, a middle connecting rod and a lower connecting rod which are sequentially connected from top to bottom, wherein, in the three-dimensional Cartesian coordinate system, when a lower end of the lower connecting rod is placed at the origin o and the lower connecting rod is placed at the positive half of the y axis, and the middle connecting rod inclines toward the negative half of the z axis, therefore an included angle A is formed between the middle connecting rod and the lower connecting rod on the y-z plane, a lower end of the upper connecting rod is connected to the middle connecting rod, and the upper end inclines toward the positive half of the z axis and forms an included angle B with the middle connecting rod on the Y-Z plane. Since the oral cavity is a cavity where the teeth locate in, the angle B formed between the middle and upper connecting rods on the y-z plane allows the measuring ruler to pass over the lip and reach the region to be repaired, when the measuring ruler is inserted into the oral cavity by holding the lower connecting rod. (when measuring, the lip is located in the concave part at an included angle B formed between the middle connecting rod and the upper connecting rod, not blocking the ruler body.) As an included angle A is formed between the middle connecting rod and the lower connecting rod on the y-z plane, the hand of the operator and the working end of the measuring ruler are not on the same horizontal plane but on a lower plane, avoiding the measuring region to be blocked by the tissues, such as hand, out of the region to be repaired, which is beneficial for accurately data acquiring and recording. Wherein, the included angle A and the included angle B can be 120°-135°.

Further, the first measuring ruler and the middle connecting rod are located on opposite sides of the upper connecting rod respectively.

Further, the middle connecting rod also inclines toward the negative half or the positive half of the x axis, thus, an included angle C is formed between the middle connecting rod and the lower connecting rod on the x-y plane, the included angle C ranges from 120° to 180° and not equal to 180°, that is, an included angle is formed between the upper connecting rod and the y axis, and the included angle is not more than 60°. For the corners of the mouth often block the measuring ruler when measuring the region to be repaired in the deep part of the mouth, in this technical scheme, the angle formed between the middle connecting rod and the upper connecting rod on the x-y plane enables the working end of the measuring ruler to stretch into the deep part of the mouth over the corners of the mouth, thus reducing the blocking of the corners of the mouth and facilitating accurate data acquisition and recording.

Further, the angle of the included angle A is 135°, and the angle of the included angle B is 120°.

Compared to the existing art, the present invention has advantages and beneficial effects as follows:

1. The occlusal distance checking can be performed simply and directly by using the first measuring ruler of the measuring apparatus in the present invention to directly compare whether the first measuring ruler can pass through the occlusion gap in the region to be repaired, effectively solving the problem that the upper restoration cannot be completed due to insufficient occlusal distance, and providing accurate and reliable basis for selecting the retention method of the abutment (screw retention or binder retention);

2. The gap (can be regarded as the space of the missing tooth) of the single missing tooth analysis is performed easily and directly by using the second measuring ruler of the measuring apparatus in the present invention to directly compare whether second measuring ruler can pass the gap in the measuring region to be repaired.

The measuring apparatus in the present invention is simpler and more accurate than visual inspection or ordinary ruler, and can effectively measure the spatial characteristics of the region to be repaired, thereby providing a basis for the design of parameters such as size and implant position of the implant as well as shape and structure of the upper prosthesis.

4. The measuring apparatus in the present invention has simple structure, and is easy to use.

BRIEF DESCRIPTION OF THE DRAWINGS

The figures described herein are used to provide a further understanding of the embodiments of the present invention and constitute a part of the present invention but without limiting the embodiments of the present invention. In the figures.

DETAILED DESCRIPTION OF PREFERRED EMBODIMENTS

In order to make the purpose, technical scheme and advantages of the present invention understood more clearly, the present invention will be further described in detail in combination with drawings and preferred embodiments. The exemplary embodiments of the present invention and description thereof are used to explain the present invention, but not improperly limit thereto.

It is to be understood that the orientation or positional relationship indicated by the terms "front", "rear", "left", "right", "up", "down", "vertical", "horizontal", "high", "low", "inside", "outside" and the like in the description of the present invention are as indicated in the drawings, only for the convenience of describing the invention and simplifying the description, and not to indicate or imply that the device or element referred to must have a specific orientation, or be constructed and operated in a specific orientation, and therefore cannot be understood as limiting the scope of protection of the invention.

Example 1

Figure 2:
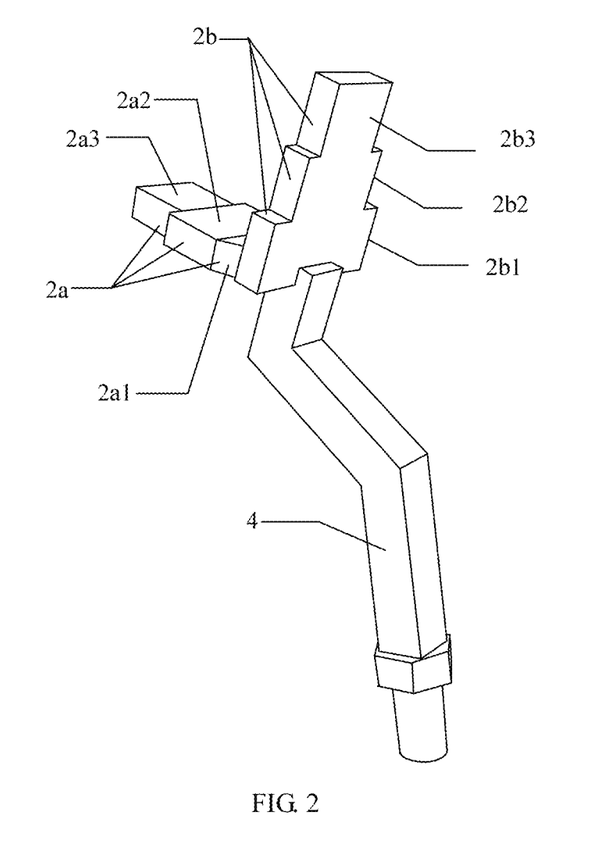
FIG. 2 is a schematic diagram of the measuring apparatus in the present invention.

As shown in FIG. 2, a measuring apparatus for measuring an occlusal distance and/or a space of a missing tooth, comprising a connecting rod 4 and a measuring head, wherein the measuring head is disposed at an upper end of the connecting rod 4.

Figure 1:
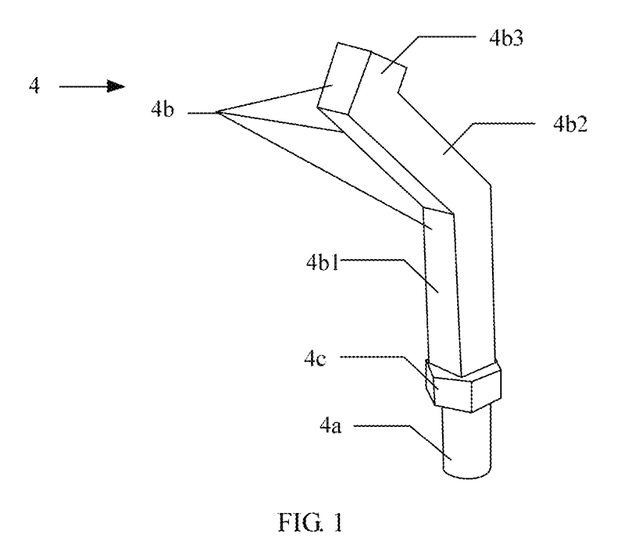
FIG. 1 is a schematic diagram of the connecting rod.

As shown in FIG. 1, the connecting rod 4 is a curved long rod and comprises a connecting rod body 4b, a connecting cylinder 4a and a hexagonal body 4c, wherein the hexagonal body 4c is a hexagonal prism with its upper end face, lower end face and cross section being regular hexagon, an upper end face of the hexagonal body 4c is connected to a lower end of the connecting rod body 4b, a lower end face of the hexagonal body 4c is connected to an upper end of the connecting cylinder 4a, and an axial direction of the connecting cylinder 4a is vertical.

The connecting rod body 4b comprises an upper connecting rod 4b3, a middle connecting rod 4b2 and a lower connecting rod 4b1 which are sequentially connected from top to bottom, the lower connecting rod 4b1 is vertically arranged, and both the upper connecting rod 4b3 and the middle connecting rod 4b2 are inclined to a certain extent. In the three-dimensional Cartesian coordinate system, if a lower end of the lower connecting rod 4b1 is placed at the origin o, and the lower connecting rod 4b1 is placed at the positive half of the y axis, then, the upper connecting rod 4b3 and the middle connecting rod 4b2 can be such positioned as to incline the middle connecting rod 4b2 toward the negative half of the z axis, therefore, an included angle A is formed between the middle connecting rod 4b2 and the lower connecting rod 4b1 on the y-z plane; a lower end of the upper connecting rod 4b3 is connected to the middle connecting rod 4b2, an upper end of the upper connecting rod 4b3 is inclined toward the positive half of the z axis and forms an included angle B with the middle connecting rod 4b2. The included angles A and B both have an angle range of 120°-135°.

The middle connecting rod 4b2 is inclined toward the left side of the lower connecting rod 4b1 with the positive half axis direction of the x axis as the front and the negative half axis direction as the rear, the positive half axis direction of the y axis as the upper and the negative half axis directions as the lower, and the negative half axis direction of the z axis as the left and the positive half axis direction as the right, thus forming an included angle A with the middle connecting rod 4b2. The upper end of the upper connecting rod 4b3 is inclined toward the right with respect to its lower end and forms an included angle B with the middle connecting rod 4b2. The lower end of the lower connecting rod 4b1 is connected to the upper end face of the hexagonal body 4c. In this example, all of the cross sections of the upper connecting rod 4b3, the middle connecting rod 4b2 and the lower connecting rod 4b1 are square.

As shown in FIG. 2, the measuring head comprises a first measuring ruler 2a and a second measuring ruler 2b, the first measuring ruler 2a and the second measuring ruler 2b are perpendicular to each other. A lower end of the second measuring ruler 2b is connected to the upper end of the upper connecting rod 4b3 of the connecting rod 4 of the second measuring assembly, and the installation direction of the second measuring ruler 2b is the same as that of the upper connecting rod 4b3; that is, the included angle between the second measuring ruler 2b and the middle connecting rod 4b2 is the same as the angle B. One end of the first measuring ruler 2a is connected to a side of the upper connecting rod 4b3 away from the middle connecting rod 4b2, and extended toward the inclined direction of the middle connecting rod 4b2; that is, the first measuring ruler 2a is located on the left side of the upper connecting rod 4b3, and the right side of the first measuring ruler 2a is connected to the left side of the upper connecting rod 4b3. The middle connecting rod is located on the right side of the upper connecting rod, therefore the first measuring ruler 2a and the middle connecting rod 4b2 are located on opposite sides of the upper connecting rod 4b3 respectively.

The second measuring ruler 2b comprises a first measuring part 2b1, a second measuring part 2b2 and a third measuring part 2b3 which are sequentially connected from bottom to top, wherein the first measuring part 2b1, the second measuring part 2b2 and the third measuring part 2b3 are rectangular plates and widths thereof are reduced sequentially reduced, and a lower end of the first measuring part 2b1 is connected to the upper end of the upper connecting rod 4b3.

The first measuring ruler 2a comprises a sixth measuring part 2a1, a fourth measuring part 2a2, and a fifth measuring part 2a3 which are sequentially connected from right to left. The fifth measuring part 2a3 is disposed away from the upper connecting rod 4b3, and one end (i.e., right end) of the sixth measuring part 2a1 away from the fourth measuring part 2a2 is connected to the left side of the upper connecting rod 4b3.

Both the fifth measuring part 2a3 and the fourth measuring part 2a2 are rectangular plates and a width of the fifth measuring part 2a3 is less than a width of the fourth measuring part 2a2. The sixth measuring part 2a1 is an isosceles trapezoid plate with its long side connected to the fourth measuring part 2a2 and its short side connected to the left side of the upper connecting rod 4b3.

Example 2

In this example, the connecting rod 4 is further improved on the basis of example 1:

When inclining toward the negative half of the z axis, the middle connecting rod 4b2 also inclines toward the negative half of the x axis, i.e. backward, thus, an included angle C is formed between the middle connecting rod 4b2 and the lower connecting rod 4b1 on the x-y plane. The included angle C ranges from 120° to 180° and not equal to 180°, that is, the angle formed between the middle connecting rod 4b2 and the positive half of the y axis is not more than 60°, in other words, the middle connecting rod 4b2 inclines backward with an inclined angle being within 60°.

The projections of the upper connecting rod 4b3 and the middle connecting rod 4b2 on the x-y plane are as shown in FIG. 1 wherein 5 represents the projection of the middle connecting rod 4b2 on the x-z plane, and 6 represents the projection of the upper connecting rod 4b3 on the x-z plane.

In other examples, when the middle connecting rod 4b2 inclines toward the negative half of the z axis, it may also incline toward the positive half of the x axis, i.e., backward, at the same angle as in this example.

Example 3

This example is a further improvement of example 1, providing specific dimension for the measuring system for analysis of space for dental implant restoration in example 1.

(1) Connecting Rod

Figure 3:
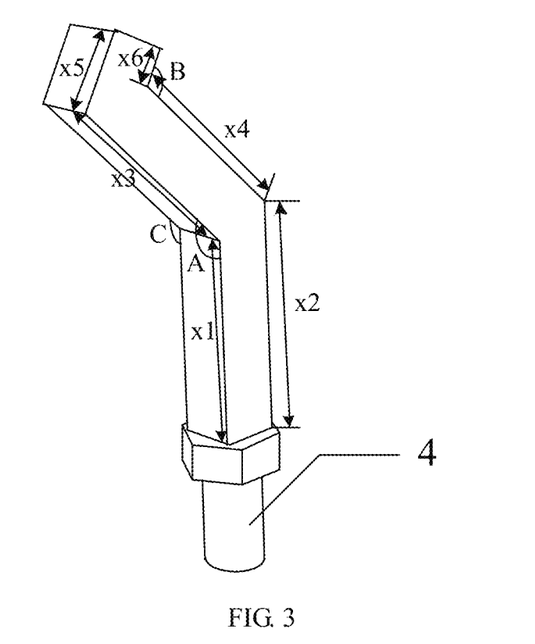
FIG. 3 is a diagram illustrating the relative dimensions of the connecting rod according to example 3.

In this example, the connecting rod is as shown in FIG. 3, the lower end of the connecting rod 4 is a connecting cylinder 4a with a length of 5 mm and a diameter of 3 mm, a hexagonal body 4c with a height of 2 mm and a side length of 2 mm is used as a connection of the connecting cylinder 4a and the connecting rod body 4b, the connecting rod body 4b is a curved long rod which has a square cross section with a 3 mm side length and has three sections which respectively are the upper connecting rod 4b3, the middle connecting rod 4b2 and the lower connecting rod 4b1, forming a shape of character "S".

The lower connecting rod 4b1 extends upward along a long axis direction of the connecting cylinder, that means, is vertically disposed, a left edge of the lower connecting rod 4b1 has a length of 11 mm and a right edge of lower connecting rod 4b1 has a length of 12 mm; the middle connecting rod 4b2 extends toward left, forming an include angle of 135° with the lower connecting rod 4b1, that means, the angle of the include angle A is 135° a left edge of the middle connecting rod 4b2 has a length of 11 mm and a right edge of middle connecting rod 4b2 has a length of 10 mm; the upper connecting rod 4b3 extends toward right, forming an include angle of 135° with the middle connecting rod 4b2, that means, the angle of the include angle A is 120°, a left edge of the upper connecting rod 4b3 has a length of 6 mm and a right edge of upper connecting rod 4b3 has a length of 4 mm;

(2) Measuring Head

Figure 4:
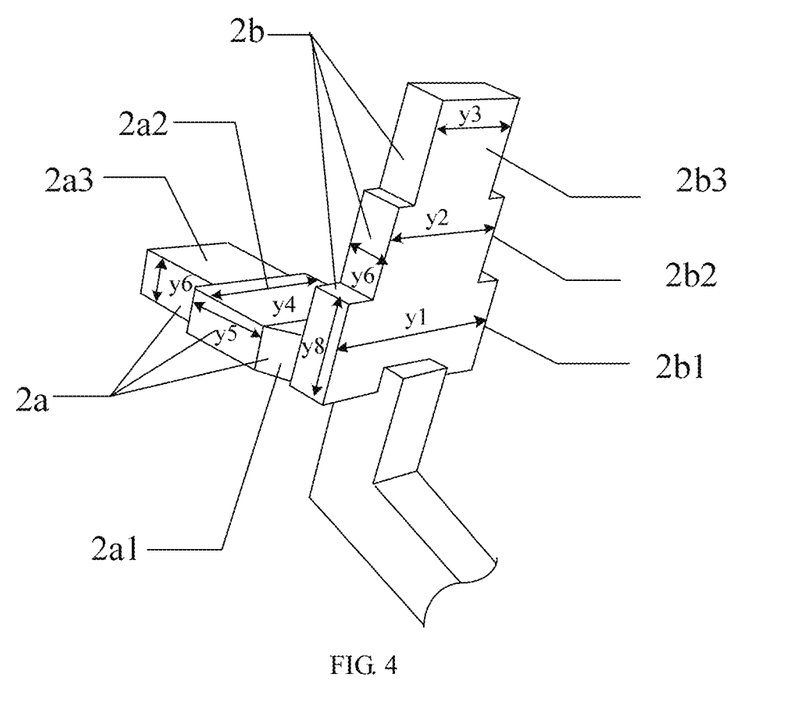
FIG. 4 is a diagram illustrating the relative dimensions of the measuring head according to example 3.
Figure 5:
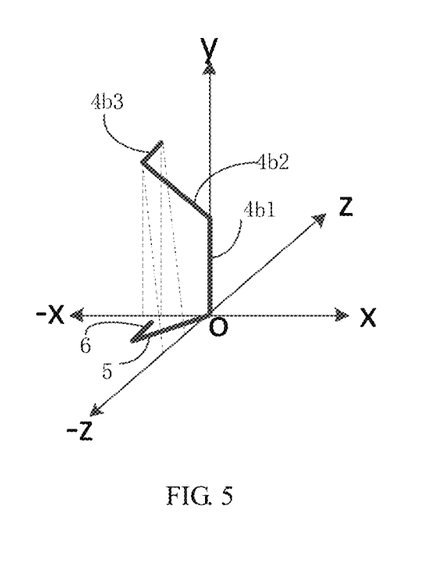
FIG. 5 is a schematic diagram of projections of the middle connecting rod and the upper connecting rod on the x-z plane according to example 2.

As shown in FIG. 4, the measuring head of the first measuring assembly comprises two rulers with a shape similar to character "T" (the first measuring ruler 2a and a second measuring ruler 2b, both of which are connected with the upper connecting rod 4b3 of the connecting rod 4).

When viewing from the top, the sixth measuring part 2a1 of the first measuring ruler 2a has a shape of isosceles trapezoid with a length of the long side thereof 7 mm, a length of the short side 3 mm and a length of each oblique side 3.6 mm; the fifth measuring part 2a3 has a shape of rectangle with a length of the long side 5 mm and a length of the short side 4 mm; the fourth measuring part 2a2 has a shape of rectangle with a length of the long side y4 equal to 7 mm and a length of the short side y5 equal to 4 mm. In practice use, the sixth measuring part 2a1 is not limited to the shape and dimension in this example, can adopts trapezoid, rectangle or any other shapes, and can has other dimensions which do not affect measurement of the fourth measuring part 2a2.

When viewing from the left or the right in FIG. 3, the second measuring part 2b2 of the second measuring ruler 2b has a shape of rectangle with a length of the long side y2 equal to 7 mm and a length of the short side y1 equal to 4 mm; the first measuring part 2b1 has a shape of rectangle with a length of the long side y1 equal to 10 mm and a length of the short side y8 equal to 4 mm; the third measuring part 2b3 has a shape of rectangle with a length of the long side y3 equal to 5 mm and a length of the short side 4 mm.

The length of the long side of the fifth measuring part 2a3, the fourth measuring part 2a2, the first measuring part 2b1, a second measuring part 2b2 and the third measuring part 2b3 respectively are corresponding width of measuring parts, while the length of the short side respectively are the height of measuring parts.

The first measuring ruler and second measuring ruler 2b both have a thickness y6 equal to 2 mm.

In practical manufacturing, the sixth measuring part 2a1, the fourth measuring part 2a2 and the fifth measuring part 2a3 can be integrally formed into a whole with uniform thickness; and the first measuring part 2b1, the second measuring part 2b2 and the third measuring part 2b3 can be integrally formed into a whole with uniform thickness.

Usage scenario and parameters of the measuring apparatus for measuring an occlusal distance and/or a space of a missing tooth in the present invention are as

TABLE 1

Comparison table of main spatial parameters of dental implant

| | Missing tooth gap Gap of the single missing tooth | Occlusal distance |
|---|---|---|
| Spatial parameters and design methods of dental implants | >10 mm: preferably large-diameter implant | >7 mm: binder retention/screw retention of upper structure |
| | 7-10 mm: preferably standard-diameter implant | 5-7 mm: preferably screw retention of upper structure |
| | 5-7 mm: preferably small-diameter implant | <5 mm: not suitable for implant restoration |
| | <5 mm: not suitable for implant restoration | |

In particular, the method for using of the aforementioned measuring apparatus is as follows:

1) Preoperative Intraoral Analysis (1.1) Measuring the gap of the single missing tooth: The second measuring ruler 2b comprises three widths, i.e. 10 mm of the first measuring part 2b1 located in the lower part, 7 mm of the second measuring part 2b2 located in the middle, and 5 mm of the third measuring part 2b3 located in the upper part. The operator holds the measuring apparatus in the present example, instructs the patient to open his mouth wide, and measures the distance between the most salient points on the adjacent surfaces near the gap between the two adjacent teeth in the region to be repaired by using the second measuring ruler 2b. If the first measuring part 2b1 at the lower part can pass the gap, the gap width of the missing teeth is demonstrated to be greater than or equal to the average width of the permanent molars 10 mm, and a large-diameter implant (>4.5 mm) can be preferably selected. If the first measuring part 2b1 at the lower part cannot pass and the second measuring part 2b2 in the middle can pass the gap, the gap width of missing teeth is demonstrated to be equal to a width of the permanent premolar, wherein the permanent premolar has a width of 7 mm tp10 mm thus an implant with a standard diameter of 3.5 mm to 4.5 mm can be preferably selected. If the second measuring part 2b2 in the middle cannot pass and the third measuring part 2b3 at the upper part can pass the gap, the gap width of missing teeth is demonstrated to be equal to a width of the permanent mandicular anterior teeth, wherein, the permanent mandicular anterior teeth has s width of 5 mm to 7 mm, thus an implant with a small diameter (being not more than 3.5 mm) is preferably selected. If the third measuring part 2b3 at the upper part cannot pass the gap, the gap is demonstrated to be too narrow (<5 mm), which is not suitable for the implant restoration.

(1.2) Checking the occlusal distance: The first measuring ruler 2a comprises two widths, respectively are 7 mm of the fourth measuring part 2a2 in the middle and 5 mm of the fifth measuring part 2a3 at the end. The operator holds the measuring apparatus in the present example and instructs the patient to occlude to maintain the widest and closest contact between the upper and lower teeth, then, conducts comparative measurement by using the first measuring ruler 2a. If the fourth measuring part 2a2 in the middle can pass the occlusion gap, the intermaxillary distance is demonstrated to be more than 7 mm, the upper prosthesis could be fixed by binders or screws. If the fourth measuring part 2a2 in the middle cannot pass and the fifth measuring part 2a3 at the end can pass, the intermaxillary distance is demonstrated to be more than 5 mm and less than 7 mm, the screw retention is preferred. If the fifth measuring part 2a3 at the end cannot pass, the intermaxillary distance is demonstrated to be less than 5 mm and the restoration space are too small to accommodate the abutment and the prosthesis, which is not suitable for the implant restoration.

2) Preoperative Model Analysis (2.1) Measuring the gap of the single missing tooth: After the study model of the patient is established, measuring the distance between the most salient points on the adjacent surfaces near the gap of two adjacent teeth in the region to be repaired in the model by using the second measuring ruler 2b. If the first measuring part 2b1 at the lower part can pass the gap, the gap width of the missing teeth is demonstrated to be greater than or equal to the average width of the permanent molars 10 mm, a large-diameter implant (>4.5 mm) can be preferably selected. If the first measuring part 2b1 at the lower part cannot pass and the second measuring part 2b2 in the middle can pass the gap, the gap width of missing teeth is demonstrated to be equal to the width of the permanent premolar, wherein the width of the permanent premolar has a range from 7 mm to 10 mm thus, the implant with a standard diameter of 3.5 mm to 4.5 mm can be preferably selected. If the second measuring part 2b2 in the middle cannot pass and the third measuring part 2b3 at the upper part can pass the gap, the gap width of missing teeth is demonstrated to be equal to the width of the permanent mandicular anterior teeth, wherein the width of the permanent mandicular anterior teeth has range from 5 mm to 7 mm, thus, the implant with a standard diameter being not more than 3.5 mm is preferably selected. If the third measuring part 2b3 at the upper part cannot pass the gap, the gap is demonstrated to be too narrow (<5 mm), which is not suitable for the implant restoration.

(2.2) Checking the occlusal distance: after the patient study model is established, occluding the upper and lower jaw models to maintain the widest and closest contact between the upper and lower teeth, then conducting comparative measurement by using the first measuring ruler 2a and holding the measuring apparatus of the present example by the operator. If the fourth measuring part 2a2 in the middle can pass the occlusion gap, the intermaxillary distance is demonstrated to be more than 7 mm, the upper prosthesis could be fixed by binders or screws. If the fourth measuring part 2a2 in the middle cannot pass and the fifth measuring part 2a3 at the end can pass, the intermaxillary distance is demonstrated to be more than 5 mm and less than 7 mm, the screw retention is preferred. If the fifth measuring part 2a3 at the end cannot pass, the intermaxillary distance is demonstrated to be less than 5 mm, the restoration space are demonstrated to be too small to accommodate the abutment and the prosthesis, which is not suitable for the implant restoration.

3) Intraoral Analysis Before Upper Restoration (3.1) Checking the occlusal distance: repeating step (1.2) before taking the mold from the patient for implant restoration.

In the present example:

The occlusal distance checking can be performed simply and directly by using the first measuring ruler 2a of the measuring apparatus of the present example to directly compare whether the first measuring ruler can pass through the occlusion gap in the region to be repaired, effectively solving the problem that the upper restoration cannot be completed due to insufficient occlusal distance, and providing accurate and reliable basis for selecting the retention method of the abutment (screw retention or binder retention).

The gap of the single missing tooth analysis is performed easily and directly by using the second measuring ruler 2b of the measuring apparatus of the present example to directly compare whether second measuring ruler 2b can pass the gap in the measuring region to be repaired.

In a word, the measuring apparatus of the present example realizes intraoral and model analyses of a series of spaces for dental implant restoration by inventing an apparatus with specific shape and structure, and making direct comparison with specific parts thereof.

The measuring system is simpler and more accurate than visual inspection or ordinary ruler, and can effectively measure the spatial characteristics of the region to be repaired, thereby providing a basis for the design of parameters such as size and implant position of the implant as well as shape and structure of the upper prosthesis. In addition, this example also gives comprehensive and detailed spatial analysis and surgical design methods before surgery and restoration, which provides a scientific and reliable surgical plan for clinicians lacking of clinical experience and helps improve the success rate of dental implantation.

The aforementioned embodiments and examples further illustrate the purposes, technical solutions and beneficial effects of the present invention in detail. It is to be understood that the foregoing is only the embodiments of the present invention, and is not intended to limit the scope of the present invention. Any modifications, equivalent substitutes, improvements and the like made within the spirit and principle of the present invention should all be included in the scope of the present invention.

What is claimed is:

1. A measuring apparatus for measuring an occlusal distance and/or a space of a missing tooth, comprising a connecting rod and a measuring head, wherein the measuring head is disposed at an upper end of the connecting rod, the measuring head comprises a first measuring ruler and a second measuring ruler, a lower end of the second measuring ruler is connected to the upper end of the connecting rod, the first measuring ruler and the second measuring ruler are perpendicular to each other, and one end of the first measuring ruler is connected to a side of the connecting rod, wherein, the second measuring ruler comprises a first measuring part, a second measuring part and a third measuring part which are sequentially connected from bottom to top, wherein the first measuring part, the second measuring part and the third measuring part are rectangular plates and widths thereof are sequentially reduced, and a lower end of the first measuring part is connected to the upper end of the connecting rod.

2. The measuring apparatus for measuring an occlusal distance and/or a space of a missing tooth according to claim 1, wherein-the first measuring ruler comprises a sixth measuring part, a fourth measuring part and a fifth measuring part connected sequentially, wherein the fifth measuring part is disposed away from the connecting rod, and an end of the sixth measuring part away from the fourth measuring part is connected to a side of the upper end of the connecting rod.

3. The measuring apparatus for measuring an occlusal distance and/or a space of a missing tooth according to claim 2, wherein both the fifth measuring part and the fourth measuring part are rectangular plates, and a width of the fifth measuring part is less than a width of the fourth measuring part.

4. The measuring apparatus for measuring an occlusal distance and/or a space of a missing tooth according to claim 1, the connecting rod comprises an upper connecting rod, a middle connecting rod and a lower connecting rod which are sequentially connected from top to bottom, wherein, in the three-dimensional Cartesian coordinate system, when a lower end of the lower connecting rod is placed at the origin o, and the lower connecting rod is placed at the positive half of the y axis, the middle connecting rod inclines toward the negative half of the z axis, therefore, an included angle A is formed between the middle connecting rod and the lower connecting rod on the y-z plane, a lower end of the upper connecting rod is connected to the lower middle connecting rod, and an upper end of the upper connecting rod inclines toward the positive half of the z axis and forms an included angle B with the middle connecting rod.

5. The measuring apparatus for measuring an occlusal distance and/or a space of a missing tooth according to claim 4, wherein the first measuring ruler and the middle connecting rod are located on opposite sides of the upper connecting rod respectively.

6. The measuring apparatus for measuring an occlusal distance and/or a space of a missing tooth according to claim 4, wherein an angle of the included angle A and the included angle B is 120°-135°.

7. The measuring apparatus for measuring an occlusal distance and/or a space of a missing tooth according to claim 4, wherein the middle connecting rod also inclines toward the negative half or the positive half of the x axis, thus, an included angle C is formed between the middle connecting rod and the lower connecting rod on the x-y plane, the included angle C ranges from 120° to180° and not equal to 180°.

8. The measuring apparatus for measuring an occlusal distance and/or a space of a missing tooth according to claim 4, wherein the angle of the included angle A is 135°, and the angle of the included angle B is 120°.

9. The measuring apparatus for measuring an occlusal distance and/or a space of a missing tooth according to claim 4, wherein the connecting rod further comprises a connecting cylinder and a hexagonal body, wherein the hexagonal body is connected between the connecting cylinder and the lower connecting rod.

10. The measuring apparatus for measuring an occlusal distance and/or a space of a missing tooth according to claim 1, wherein the connecting rod comprises an upper connecting rod, a middle connecting rod and a lower connecting rod which are sequentially connected from top to bottom, wherein, in the three-dimensional Cartesian coordinate system, when a lower end of the lower connecting rod is placed at the origin o, and the lower connecting rod is placed at the positive half of the y axis, the middle connecting rod inclines toward the negative half of the z axis, therefore, an included angle A is formed between the middle connecting rod and the lower connecting rod on the y-z plane, a lower end of the upper connecting rod is connected to the middle connecting rod, and an upper end of the upper connecting rod inclines toward the positive half of the z axis and forms an included angle B with the middle connecting rod.

11. The measuring apparatus for measuring an occlusal distance and/or a space of a missing tooth according to claim 2, wherein the connecting rod comprises an upper connecting rod, a middle connecting rod and a lower connecting rod which are sequentially connected from top to bottom, wherein, in the three-dimensional Cartesian coordinate system, when a lower end of the lower connecting rod is placed at the origin o, and the lower connecting rod is placed at the positive half of the y axis, the middle connecting rod inclines toward the negative half of the z axis, therefore, an included angle A is formed between the middle connecting rod and the lower connecting rod on the y-z plane, a lower end of the upper connecting rod is connected to the middle connecting rod, and an upper end of the upper connecting rod inclines toward the positive half of the z axis and forms an included angle B with the middle connecting rod.

12. The measuring apparatus for measuring an occlusal distance and/or a space of a missing tooth according to claim 3, wherein the connecting rod comprises an upper connecting rod, a middle connecting rod and a lower connecting rod which are sequentially connected from top to bottom, wherein, in the three-dimensional Cartesian coordinate system, when a lower end of the lower connecting rod is placed at the origin o, and the lower connecting rod is placed at the positive half of the y axis, the middle connecting rod inclines toward the negative half of the z axis, therefore, an included angle A is formed between the middle connecting rod and the lower connecting rod on the y-z plane, a lower end of the upper connecting rod is connected to the middle connecting rod, and an upper end of the upper connecting rod inclines toward the positive half of the z axis and forms an included angle B with the middle connecting rod.

13. The measuring apparatus for measuring an occlusal distance and/or a space of a missing tooth according to claim 10, wherein the first measuring ruler and the middle connecting rod are located on opposite sides of the upper connecting rod respectively.

14. The measuring apparatus for measuring an occlusal distance and/or a space of a missing tooth according to claim 11, wherein the first measuring ruler and the middle connecting rod are located on opposite sides of the upper connecting rod respectively.

15. The measuring apparatus for measuring an occlusal distance and/or a space of a missing tooth according to claim 12, wherein the first measuring ruler and the middle connecting rod are located on opposite sides of the upper connecting rod respectively.

16. The measuring apparatus for measuring an occlusal distance and/or a size of a space of a missing tooth according to claim 10, wherein, an angle of the included angle A and the included angle B is 120°-135°.

17. The measuring apparatus for measuring an occlusal distance and/or a size of a space of a missing tooth according to claim 11, wherein, an angle of the included angle A and the included angle B is 120°-135°.

18. The measuring apparatus for measuring an occlusal distance and/or a size of a space of a missing tooth according to claim 12, wherein, an angle of the included angle A and the included angle B is 120°-135°.

19. The measuring apparatus for measuring an occlusal distance and/or a space of a missing tooth according to claim 10, wherein the middle connecting rod also inclines toward the negative half or the positive half of the x axis, thus, an included angle C is formed between the middle connecting rod and the lower connecting rod on the x-y plane, the included angle C ranges from 120° to 180° and not equal to 180°.

* * * * *